(12) United States Patent
Manton (10) Patent No.: US 7,546,259 B1
(45) Date of Patent: Jun. 9, 2009

(54) APPARATUS, METHOD AND SYSTEM FOR A SECURITIES TRACKING MANAGEMENT SYSTEM

(75) Inventor: Michael Manton, Arlington, MA (US)

(73) Assignee: Thomson Financial LLC, New York, NY (US)

( * ) Notice: Subject to any disclaimer, the term of this patent is extended or adjusted under 35 U.S.C. 154(b) by 785 days.

(21) Appl. No.: 10/856,271

(22) Filed: May 28, 2004

(51) Int. Cl.
*G06Q 40/00* (2006.01)
*G06F 7/00* (2006.01)

(52) U.S. Cl. .................. 705/35; 705/36 R; 705/37; 707/3; 707/E17.008; 707/5

(58) Field of Classification Search .............. 707/3, 707/5, E17.008; 705/35, 36 R, 37
See application file for complete search history.

(56) References Cited

U.S. PATENT DOCUMENTS

| | | | |
|---|---|---|---|
| 6,111,953 A * | 8/2000 | Walker et al. | 380/51 |
| 2004/0083159 A1 * | 4/2004 | Crosby et al. | 705/37 |
| 2004/0128516 A1 * | 7/2004 | Okamoto et al. | 713/179 |
| 2005/0044023 A1 * | 2/2005 | Rotman et al. | 705/35 |
| 2007/0226122 A1 * | 9/2007 | Burrell et al. | 705/37 |
| 2008/0243620 A1 * | 10/2008 | Prorock et al. | 705/14 |

OTHER PUBLICATIONS

Securities Industry Immobilization and Dematerialization Implementation Guide, Verson 2.0 http://www.sifma.org/services/techops/pdf/SIADematerializationImpGuide.pdf.*
SIA STP Corporate Actions Subcommittee, May 2004 http://www.sifma.org/services/techops/pdf/CA_PDP_Recs.pdf.*
SIA Letter to John Walsh, Apr. 24, 2003.*
Securities Dematerialization White Paper, Jun. 2000 http://bma.gfma.com/stp/pdf/CA_PDP_Recs.pdf.*
Institutional Developments in the Globalization of Securities and Futures Markets Scarlata, Jodi G. Review—Federal Reserve Bank of St. Louis. St Louis: Jan./Feb. 1992, vol. 74, Iss. 1.*
Market reforms roll on Anonymous. Asiamoney. London: Nov. 1995. vol. 6, Iss.*

(Continued)

*Primary Examiner*—Hani Kazimi
*Assistant Examiner*—William E Rankins
(74) *Attorney, Agent, or Firm*—Locke Lord Bissell & Liddell LLP (57) ABSTRACT

An apparatus, method, and system that implements a Securities Tracking Management System (STMS) for providing an effective solution to clear, track, detect, manage, and alert various entities of invalid securities certificates. The STMS tracks securities certificates (particularly as they become invalid), and enables users to promptly query for invalid securities certificates without requiring the intervention of a transfer agent. In one embodiment, the STMS contains details of all invalid physical certificates that ever existed. The STMS may act as an early warning system for the clearing of physical certificates during the dematerialization process. Further, the STMS may also issue alerts of attempts to convert in securities certificates that are already marked as invalid in the STMS database. Further, the STMS allows the various entities involved in securities certificate trafficking to better track and manage expired certificates in an easier, more secure and transparent manner. The result and manner in which this is achieved, yields the generation of a never before available clearinghouse for securities certificates at the time of dematerialization.

5 Claims, 5 Drawing Sheets

OTHER PUBLICATIONS

Emerging equity markets in India: A case study Dan W Hess. Managerial Finance. Patrington: 1998. vol. 24.*

Box V.2. Improving the financial infrastructure of stock markets Economics and Social Survey of Asia and the Pacific. Bangkok: 2001.*

Canada Weighs Converting Securities Certificates Into Electronic Positions Canada NewsWire. Ottawa: Nov. 5, 2001.*

Canada Weighs Converting Securities Certificates Into Electronic Positions Canada NewsWire. Ottawa: Nov. 5, 2001, p. 1.*

Securities Dematerialization White Paper, Version 1.6, Jun. 5, 2000.*

SIA STP Corporate Actions Subcommittee, STP Recommendations on Corporate Actions Physical Securities, DRS, and Payments Processing, May 2004.*

Box V.2. Improving the financial infrastructure of stock markets Economic and Social Survey of Asia and the Pacific. Bangkok.*

Institutional Developments in the Globalization of Securities and Futures Markets Scarlata, Jodi G. Review—Federal Reserve Bank of St. Louis. St. Louis: Jan./Feb. 1992. vol. 74, Iss. 1; p. 17, 14 pgs.*

* cited by examiner

APPARATUS, METHOD AND SYSTEM FOR A SECURITIES TRACKING MANAGEMENT SYSTEM

FIELD

The present invention is directed generally to an apparatus, method, and system of tracking data, and more particularly, to an apparatus, method and system to clear, track and manage securities records through expiration.

BACKGROUND

Financial Systems

Computerized marketplaces of all kinds range from simple classified ad bulletin boards to complex mainframe-based market systems such as NASDAQ, which offers a real-time market-making system for tens of thousands of securities brokers. All modern stock, bond and commodity exchanges are supported by underlying computerized databases and related systems, which enable them to function.

Trading systems for items having substantial value generally are an automated version of a manual trading process. For example, securities trading systems are based on a model wherein a customer contacts a so-called retail broker to place an order. The broker, in turn, submits the order to a dealer who executes the order and returns an order confirmation to the broker. Once a security has been procured, the purchaser is entitled to a physical certificate representing the security and commemorates the transaction, which signifies the owner's share in an entity. Often, instead of receiving a physical share (commonly represented by way of a physical certificate), an owner's stake in an entity is represented by electronic securities records maintained in securities management systems. Investors also have the option of converting physical certificates into electronic records and vice versa. To convert from one format to another, an investor may ask their broker, who in turn needs to coordinate with various other entities to ensure that the investor receives the proper record of their stake. This process of providing an investor with a change in certificate record takes days because of coordination required between various entities such as issuers, transfer agents, clearing corporations, etc. Importantly, securities trading and transfer is heavily regulated. Many of the terms and conditions prevalent in securities trades and transfers are limited by convention and regulation. Such financial systems typically rely on underlying information technology systems, user interface, networks, and/or other core technologies.

Information Technology Systems

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. A computer operating system, which, typically, is software executed by CPU on a computer, enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through database software. Information technology systems provide interfaces that allow users to access and operate various system components. Often information technology systems interoperate across networks. Networks are commonly thought to comprise of the interconnection and interoperation of clients, servers, and intermediary nodes in a graph topology. It should be noted that the term "server" as used herein refers generally to a computer, other device, software, or combination thereof that processes and responds to the requests of remote users across a communications network. Networks are generally thought to facilitate the transfer of information from source points to destinations.

SUMMARY

No effective solution to identify invalid securities certificates is available at the time of dematerialization. Invalid status connotes any stop that can cause a trade rejection and/or failure within a securities settlement cycle. In part, dematerialization entails the process by which physical certificates are eliminated so that securities only exist as accounting entries. In one embodiment, dematerialization can occur with an investor working with a financial institution such as a broker or bank to initiate the process. The broker may review the physical certificate and will key in the identifying details into the Securities Tracking Management System (STMS) to ensure that the physical certificate is valid. In one embodiment, the STMS contains details of all invalid physical certificates that ever existed. The STMS saves the broker and the investor at least three days in time because it promptly provides invalidity status regarding the keyed certificate. Prior to Applicants' instant invention, a broker would take possession of the physical certificate and submit the certificate to the appropriate transfer agent via the Depository Trust & Clearing Corporation, which would take three days to ascertain if the physical certificate was valid or not. The STMS allows for the identification of corresponding invalid securities certificates in seconds instead of days. The STMS may act as an early warning system for the clearing of physical certificates during the dematerialization process.

Moving from physical certificates to electronic book-entry recordings can lead to various integrity issues regarding the securities including loss, re-introduction of what was thought to be lost, fraud, and/or other invalidity issues. For example, an investor may lose a certificate and have it replaced after reporting the loss. Later the investor innocently presents the original certificate that was thought to be lost, but later was found. But now the replacement certificate has value, and the originally lost certificate does not have value as it has become invalid. In such a circumstance, the disclosed STMS can help identify the invalid certificate so the financial person aiding the investor may reclaim the originally lost certificate and submit it to a transfer agent who will note the certificate for destruction and then destroy the certificate. Similarly, unscrupulous people could try to manipulate such circumstances for fraudulent motives and attempt to collect on invalid certificates. In this regard, the STMS helps to clear and maintain the integrity and value for underlying securities represented by certificates promptly, without delay, at the time of dematerialization. When investors bring certificates to brokers, brokers and other entities may check for the validity of the certificates at the time of dematerialization and obtain instant notification if invalid entries exist for that security, or otherwise provide an invalidity status entry for future searches. The STMS, similarly, may provide notice of invalidity in such fraudulent occurrences, thereby avoiding and/or reducing fraudulent activity. Prior to Applicants' instant invention, there was no uniform and/or singular clearinghouse mechanism containing the details of invalid securities certificates that could be used to clear securities certificates at the time of dematerialization. As a consequence, by providing a complete and centralized database, the STMS can reduce the time to clear, transfer, and dematerialize certificates from three-to-ten days down to seconds.

The STMS allows the various entities involved in securities certificate processing to better clear, track and manage invalid certificates in an easier, more secure and transparent manner, which was heretofore unavailable.

In accordance with certain aspects of the disclosure, the above-identified problems of processing invalid certificates are overcome and a technical advance is achieved in the art of securing and detecting transactions in invalid certificates. An exemplary Securities Tracking Management System includes a method to track securities certificates on a computer. The method comprises obtaining identifying indicia for specified physical securities certificates, and querying a database with the indicia. Further, the method goes on to store updated values in database records associated to the specified physical securities (which indicates potential trafficking of invalid certificates).

In accordance with another embodiment, an apparatus to track securities certificates is disclosed. The apparatus has a memory for storing instructions and a processor that can issue the instructions stored in memory. The stored instructions issue signals to: to obtain identifying indicia for specified physical securities certificates, to query a database with the indicia, and to store updated values in database records associated to the specified physical securities indicating illicit trafficking activity.

BRIEF DESCRIPTION OF THE DRAWINGS

The accompanying drawings illustrate various non-limiting, example, inventive aspects in accordance with the present disclosure.

The leading number of each reference number within the drawings indicates the first figure in which that reference number is introduced. As such, reference number 101 is first introduced in FIG. 1. Reference number 201 is first introduced in FIG. 2, etc.

DETAILED DESCRIPTION

The STMS allows the various entities involved in securities certificate processing to better track and manage invalid certificates in an easier, more secure and transparent manner at the point of dematerialization.

Entity Topology

Figure 1:
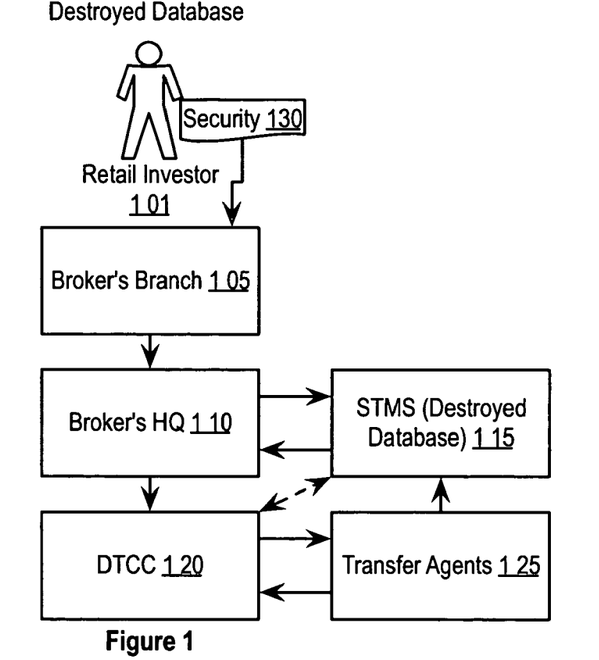
FIG. 1 is of a data-flow diagram illustrating embodiments of a topology for alerts in a Securities Tracking Management System in accordance with the present invention.

FIG. 1 illustrates embodiments as a topology for a Securities Tracking Management System. In this embodiment, a retail investor 101 may bring securities 130 to a broker's branch 105. A broker at the branch office can generate a search at a terminal that is disposed in communications with the broker's headquarters 110. The search is generated by the broker entering unique, identifying information from the security certificate into the terminal. The broker's headquarters is disposed in communication with the Depository Trust & Clearing Corporation (DTCC) 120 and the STMS, which contains a database. The STMS database tracks invalid securities 115 and other data as will be discussed in greater detail throughout the disclosure. In turn, the DTCC 120 and the STMS are each disposed in communication with transfer agents 125. In an alternative embodiment, the STMS is also disposed in communication with the DTCC 120. In such arrangements, the STMS can provide information and searching facilities to those very same entities by acting as an information repository regarding such securities transactions.

Brokers interact with the investing public and arrange transactions between security trading entities, i.e., various buyers and sellers. The DTCC holds various securities assets, and clears and settles securities transactions. The STMS tracks securities (particularly invalid certificates), enables users to query for securities, determines if invalid securities transactions are taking place, alerts users to invalid securities being processed, acts as a verification facility to validate transactions, and more. Transfer agents: act as intermediaries between transferring entities; issue and cancel certificates as ownership changes; and hold destroyed, lost, escheated, stolen, and/or otherwise invalid certificates.

The broker's branch may collect a retail investor's security certificate 130 and provide it to the DTCC through the broker's headquarters. Notice of the security transfer may be provided to the STMS by the broker 105, 110 through the broker's terminal 105, and the broker's network system 110. As the ownership status changes for the security, the transfer agents 125 make note of such changes. Also, the transfer agents receive invalid securities certificates and provide this information to the STMS. Thus, receipt of physical securities 130 are noted at terminals at the various points in the topology 105, 110, 120, 125 and securities status if invalid is stored in the STMS. Communication with the STMS is provided by way of database adapters at the STMS that communicate with an information server at the STMS, which in turn provides searching, retrieval, and record storing facilities through a Web based interface. Thus any of the entities 105, 110, 120, 125, may access the STMS database by employing a standard Web browser over a secure connection, e.g., HTTPS, with the provision of the requisite entity authentication information, e.g., a user name and password to access the STMS.

Figure 2:
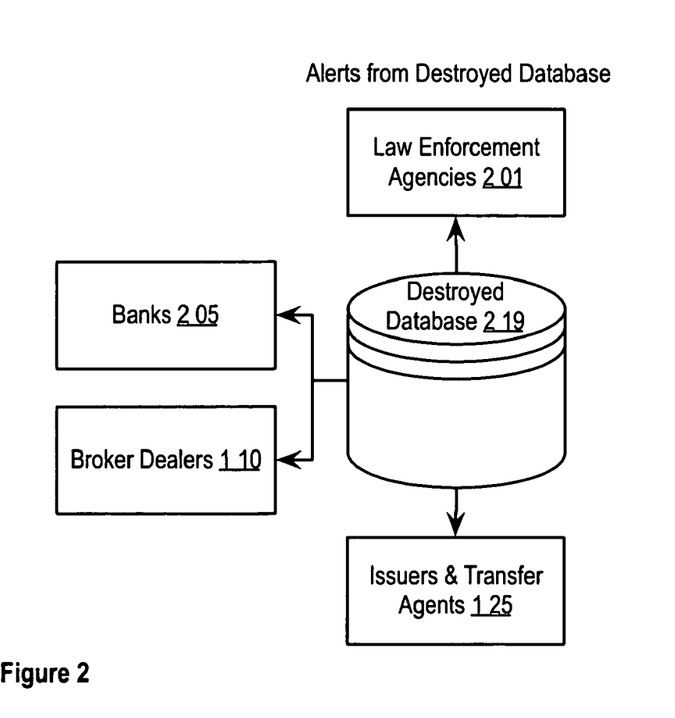
FIG. 2 is of a data-flow diagram illustrating embodiments of a topology for a Securities Tracking Management System in accordance with the present invention.

FIG. 2 illustrates embodiments as a topology for alerts in a Securities Tracking Management System. In this embodiment, the STMS, which contains a database of invalid securities 219, et al., is disposed in communication with various law enforcement agencies and organizations (e.g., the Federal Bureau of Investigation (FBI), the Securities Exchange Commission (SEC), and/or the like) 201, banks 205, broker dealers 110, and issuer and transfer agents 125. The STMS may then issue alerts to any and/or all of the interconnected entities depending on the occurrence of various threshold events, as shall be described throughout the disclosure. In one embodiment, the broker making the inquiry will always receive a confirming report and/or alert from the database stating if the certificate in question is valid or not. The alerts may be addressed to various institutional and/or individual entities. The alerts may take the form of: e-mails and HTTP(S) post messages via the World Wide Web. Alerts may also be made through a pager network, the telephone network conveyed through voice synthesis, a voice mail system conveyed through voice synthesis, faxes, and/or the like. Further, the alerts may provide directives specific to a receiving entity. The proper receiving party may be discerned by keeping a set of contact addresses saved in the STMS database. In another embodiment, alerts are sent back to entities driving the current transaction. In such an embodiment, as a broker entering information regarding an already expired certificate would have provided his/her IP address in accessing the STMS, and thus, the STMS may target its alerts back at the broker. In another example, an alert provided to a law enforcement agency 201, may provide the address of where a questionable securities transaction is taking place. In such an instance, if a retail investor brought securities to a broker for conversion into an electronic form, and the securities were supposed to have been destroyed (i.e., there is a strong suspicion that the retail investor is engaging in a fraudulent conversion of already expired securities certificates), then the STMS might issue an alert to law enforcement agencies 201 containing security identifying information, e.g., the retail investor's name and the address of the broker dealer 210 in question. In the same instance, the STMS may provide a Web based alert to the broker dealer 210 announcing it is to confiscate the questionable securities certificates and that the authorities are en route.

It should be noted that because the STMS tracks invalid certificates, a search match, i.e., a "hit," does not necessarily connote a fraudulent transaction. As mentioned previously, there may be innocent reasons for a hit, such as an investor bringing in a previously thought-to-be-lost certificate that had has already been replaced. As such, in one embodiment, alerts may be issued to brokers or entities driving the current transaction. The confirmatory alerts would provide notice that there is cause for further investigation and potential concern, which thereby allows a bank, broker, and/or the like to make a value judgment and follow-up and/or alert the authorities based on their assessment of the situation.

STMS Database Topology

Figure 3:
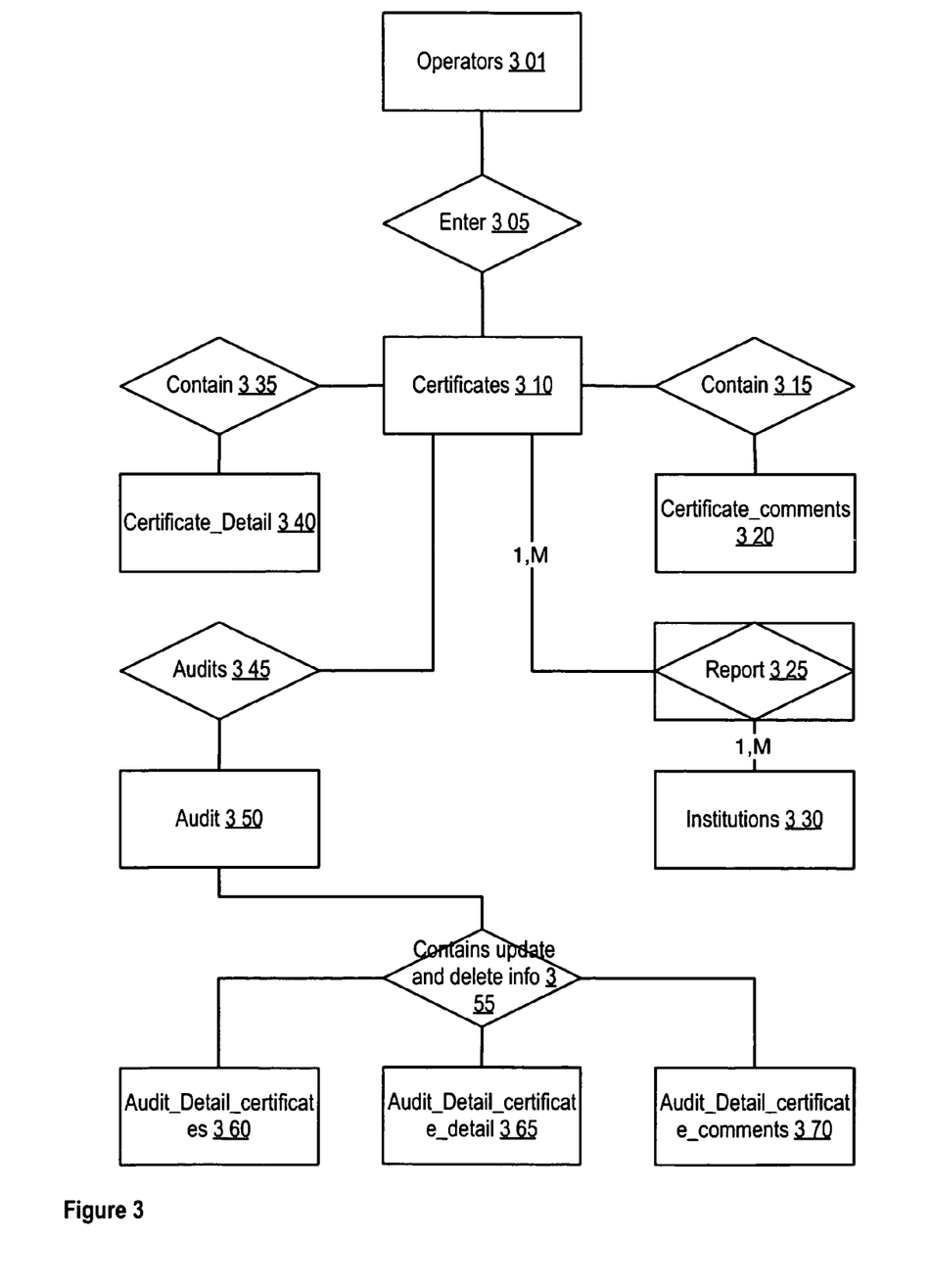
FIG. 3 is of an entity-relationship diagram illustrating embodiments of a topology for an Securities Tracking Management System database in accordance with the present invention.

FIG. 3 is of an entity-relationship (ER) diagram illustrating embodiments of a topology for a Securities Tracking Management System database. The STMS database is used by the STMS to store data regarding the processing of invalid securities certificates. The STMS database may be used by the STMS for querying, detecting invalid certificates, which in turn may be the basis of the STMS to issue alerts. ER diagrams represent the logical structure of the STMS database. In the ER diagram, rectangles indicate entities. The entities map to database tables in the STMS database. In turn, the database tables contain various fields, which are detailed below in tabular form. The ER diagram also contains diamond shaped boxes, which are interconnected between entities to show a relationship between the entities. Relations may be implemented by linking two tables via a common field; the field being a unique and key field in at least one of the tables. A diamond inside a rectangle indicates a many-to-many relationship, which requires the use of a bridge table. This table does not define an entity, rather, it is used to facilitate the many-to-many relationship between two entities.

Certificates Table

The certificate table 310 contains key fields. The certificate table generally stores information relating to securities certificates. Fields in the certificate table may include:

| Field | Description |
| --- | --- |
| Cusip | Committee on Uniform Security Identification Procedures (CUSIP) Number represents a standard way to identify securities |
| Operator_id | Foreign key relating to the operators table 301. |
| Cert_Num | Securities Certificate Number |
| Trans_Date | Transaction Date |
| Trans_Num | Transaction Number |
| Trans_Type | Transaction Type |
| Rpt_Ctl_Num | Report control number |
| Origin_Date | |
| Rpt_Source | Report source |
| Security_Type | This field identifies the type of security represented by the certificate. 'CB' = corporate bond; 'CD' = convertible Debenture; 'CS' - common stock; 'D' = debenture; 'E' = other (exception; 'GA' = government agency; 'MB' = municipal Bond; 'MF' = mutual fund; 'N' = note; 'O' = option; 'PS' = preferred stock; 'R' = right; 'W' = warrant 'UT' unit |
| Invalid_Type | This field represents how the certificate has come to expire. 'C' = Cancelled; 'D' = Disputed; 'E' = Other; 'G' = Litigation; 'L' = Lost; 'N' =Non-Loss; 'S' = Escheated; 'T' = Stolen; 'Z' = Destroyed |
| Detail_Source_Flag | |
| Report ID | Primary Key. The ID of the certificate. |

Certificate Detail Table

The certificate detail table 340 contains and relates 335 to the certificates table 310. Fields in the certificate detail table 340 may include:

| Field | Description |
| --- | --- |
| Report_ID | Foreign key relating to certificates table 310. The ID of the certificate. |
| Invalid_Location | This field represents where the certificate has come to expire. 'M' = mail; 'D' = delivery; 'C' = clearing 'P' = premises; 'O' = other |
| Rpt_Invalid_Location | This field represents where the certificate's expiration was discerned. 'M' = mail; 'D' = delivery; 'C' = clearing 'P' = premises; 'O' = other |
| Cert_Location | This field represents holds the last know whereabouts of the certificate |
| Cert_Location_Type | This field represents where the type of location of the certificates last known whereabouts. 'M' = mail; 'D' = delivery; 'C' = clearing 'P' = premises; 'O' = other |
| Criminality | Flag identifies criminal activity if set |

-continued

| Field | Description |
| --- | --- |
| Counterfeit | Flag identifies counterfeit certificates exist |
| Invalid_Location | This field represents where the certificate has come to expire. 'M' = mail; 'D' = delivery; 'C' = clearing 'P' = premises; 'O' = other |
| Full_Cert_Num | The full certificate number |
| Shares | |
| Issue_Date | |
| Holder | |
| Issuer | |
| ReportDate | |
| Filed_Fbi | |
| Filed_Police | |
| Interest_Rate | |
| Mat_Date | Maturity date |
| Mod_Date | Modified date |
| Mod_Reason | |
| Disputed_Item | |

Certificate Comments Table

The certificate detail table 340 contains and relates 335 to the certificates table 310. Fields in the certificate detail table may include:

| Field | Description |
| --- | --- |
| Audit_id | Foreign key relating back to audit table 350 |
| Report ID | Foreign key relating to certificates table 310. The ID of the certificate. |
| Market_Val_before | The respective values before the audit |
| Criminality_before | |
| Counterfeit_before | |
| Full_Cert_Num_before | |
| Shares_before | |
| Issue_Date_before | |
| Holder_before | |
| Issuer_before | |
| ReportDate_before | |
| Filed_Fbi_before | |
| Filed_Police_before | |
| Interest_Rate_before | |
| Mat_Date_before | |
| Disputed_Item_before | |
| Market_Val_after | The respective values after the audit |
| Criminality_after | |
| Counterfeit_after | |
| Full_Cert_Num_after | |
| Shares_after | |
| Issue_Date_after | |
| Holder_after | |
| Issuer_after | |
| Report_Date_after | |
| Filed_Fbi_after | |
| Filed_Police_after | |
| Interest_Rate_after | |
| Mat_Date_after | |
| Disputed_Item_after | |

The certificate comments table 320 contains and relates 315 to the certificates table 310. Fields in the certificate detail table may include:

| Field | Description |
| --- | --- |
| Report cert_id | Foreign key relating to certificates table 310. The ID of the certificate. |
| Comments | Any additional comments, transfer agent, insurance company, etc. |

Operator Table

The operators table 301 contains and relates 305 to the certificates table 310. Fields in the certificate detail table may include:

| Field | Description |
| --- | --- |
| Operator_id | Primary key to operators table |
| Operator_name | Operators name (other fields of interest could be added to track additional operator info) |

Institutions Table

The institutions table 301 relates 325 to the certificates table 310 through the report relationship table 325. The Institution_id field (see table below) in the institutions table 330 and any number of key fields from the certificates table 310 may be employed to construct the report table 325 through which many-to-many relationships may be established as between the certificates and institutions tables. Fields in the certificate detail table may include:

| Field | Description |
| --- | --- |
| Institution_id | Primary key to institution table |
| Branch ID | Institution Branch ID number |
| _Access Code | Password code |

Audit Table

The audit table 350 contains and relates 345 to the certificates table 310. Fields in the certificate detail table may include:

| Field | Description |
| --- | --- |
| Audit_id | Primary key to audit table |
| Time | Time of action |
| Date | Date of action |
| Action | Type of action (Insert, Update, Delete) |
| Report_id | Foreign key relating to certificates table 310. The ID of the certificate. |
| Operator_id | Foreign key relating to the operators table 301 |
| Mod_Reason | The user could be prompted to enter reason for changes or deletions if this data is needed. |

Audit Detail Certificate Table

The audit detail certificate table 360 contains update and deletion information relating 355 to the audit table 350. Fields in the certificate detail table may include:

| Field | Description |
|---|---|
| Audit_id | Foreign key relating back to audit table 350 |
| Cusip_before | The respective values before the audit |
| Operator_id_before | |
| Cert_Num_before | |
| Trans_Date_before | |
| Trans_Num_before | |
| Trans_Type_before | |
| Rpt_Ctl_Num_before | |
| Origin_Date_before | |
| Rpt_Source_before | |
| Security_Type_before | |
| Invalid_Type_before | |
| Detail_Source_Flag_before | |
| Cusip_after | The respective values after the audit |
| Operator_id_after | |
| Cert_Num_after | |
| Trans_Date_after | |
| Trans_Num_after | |
| Trans_Type_after | |
| Rpt_Ctl_Num_after | |
| Origin_Date_after | |
| Rpt_Source_after | |
| Security_Type_after | |
| Invalid_Type_after | |
| Detail_Source_Flag_after | |
| Report Id_after | |

Audit Detail Certificates Detail Table

The audit detail certificate detail table 365 contains update and deletion information relating 355 to the audit table 350. Fields in the certificate detail table may include:

| Field | Description |
|---|---|
| Details_before | |
| Details_after | |
| Audit_id | Foreign key relating back to audit table 350 |

Audit Detail Certificates Comments Table

The audit detail certificate comments table 370 contains update and deletion information relating 355 to the audit table 350. Fields in the certificate detail table may include:

| Field | Description |
|---|---|
| Audit_id | Foreign key relating back to audit table 350 |
| Comments_before | |
| Comments_after | |

Current Report Certificates Table

In an alternative embodiment, various tables may be conglomerated into a single current Invalid certificates (Report_cert) table. For example, the certificates 310, certificate detail 340, certificate comments 320, operators 301, and institutions 330 institutions tables may form the following Report_cert table and fields:

| Field | Description |
|---|---|
| Cusip | |
| Cert_Num | |
| Trans_Date | |
| Trans_Prefix | |
| Trans_Num | |
| Trans_Type | |
| Rpt_Ctl_Num | |
| Origin_Date | |
| Branch ID | |
| Password code | |
| Rpt_Source | |
| Market_Val | |
| Security_Type | |
| Invalid_Type | |
| Criminality | |
| Counterfeit | |
| Detail_Source_Flag | |
| Full_Cert_Num | |
| Shares | |
| Issue_Date | |
| Holder | |
| Issuer | |
| Report_Date | |
| Filed_Fbi | |
| Filed_Police | |
| Interest_Rate | |
| Mat_Date | |
| Counterfeit_Comments | |
| Comments | |
| Report_Id | This is the primary key to the Report_cert table |
| Mod_Date | |
| Mod_Reason | |
| Disputed_Item | |

Similarly, any of the tables of FIG. 3 may be combined in numerous ways to suit various deployment requirements. For example, an audit Invalid (audit_Invalid) table may be formed by conglomerating the audit 350, audit detail certificate 360, audit detail certificate detail 365, and audit detail certificate comments 370 tables. In addition, various tables may be duplicated and renamed for performance and data integrity purposes. For example, report tables may be created to track all transactions and errors processed by the STMS. A report_history table (see 509 of FIG. 5) may track each record accessed by the STMS database. A report_error table (see 513 of FIG. 5) may track all errors reported by the STMS database. An inquiry table (see 515 of FIG. 5) may track all inquiries on the STMS database. A hits table (see 517 of FIG. 5) may track any searches or otherwise detections on invalid securities certificates; having a separate table just for hits would allow for faster querying by the STMS. Such examples would serve to enhance the security and integrity of the STMS database by providing detailed transaction histories.

Expired Securities Query Detection

Figure 4:
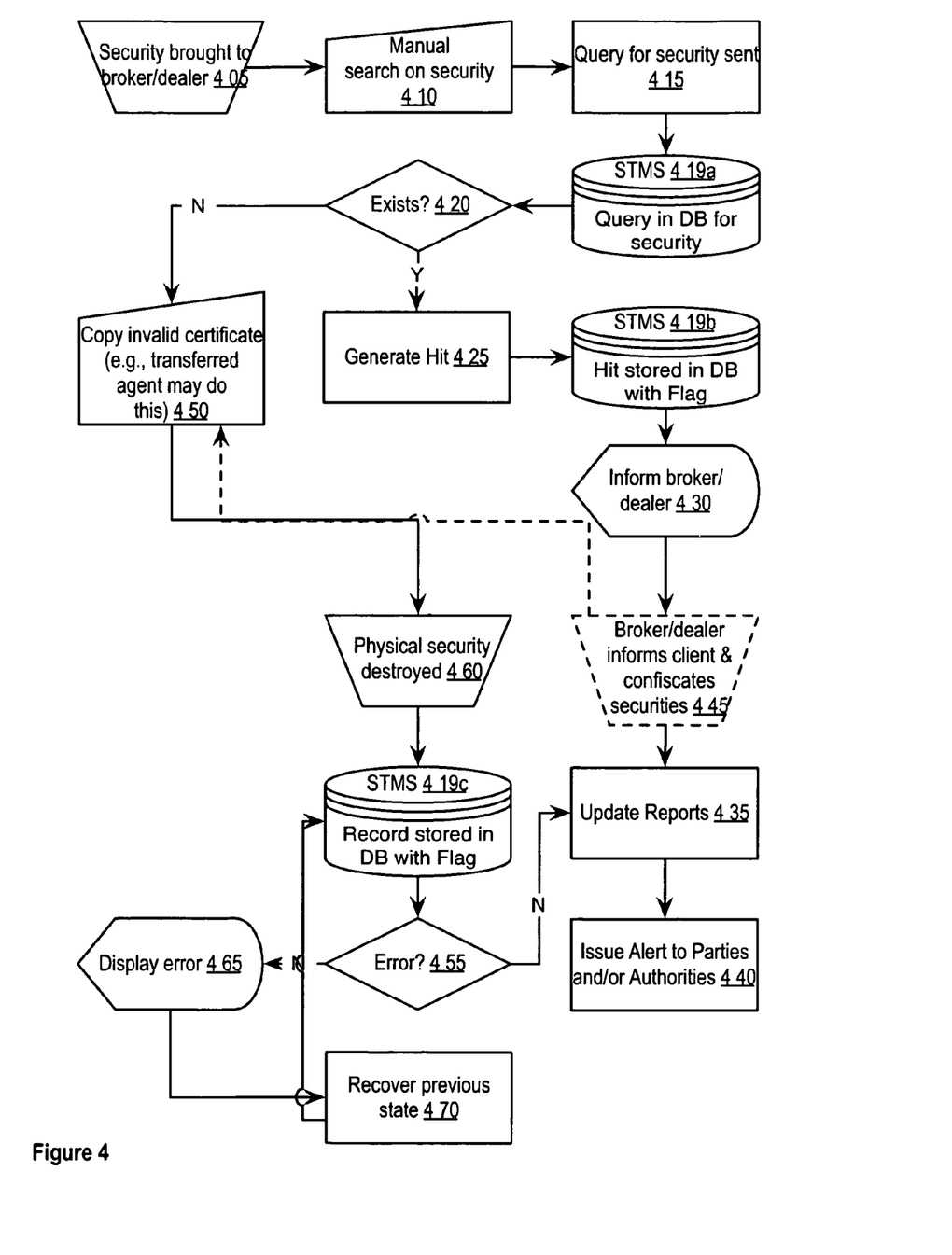
FIG. 4 is of a logic-flow diagram illustrating embodiments of a Securities Tracking Management System detecting expired securities during querying in accordance with the present invention.

FIG. 4 is of a logic flow diagram illustrating embodiments of a Securities Tracking Management System detecting invalid securities during querying. In this embodiment, a security certificate arrives at a broker 405. Ordinarily, an investor or other entity may provide the certificates as part of a movement of securities from one account to another, or perhaps for conversion from physical form to electronic form. Such movement of physical securities results in a broker or dealer to search the STMS based on identifying information on the securities certificates 410. For example, certificate identifying numbers (e.g., CUSIP) may be used.

In one embodiment, the broker logs-on (e.g., by providing a username and password) to a Web browser on a remote terminal and connects to the STMS over a communications network. The STMS employs an information server disposed in communication with the STMS database (e.g., through a database adapter), which parses queries based on search criteria. Results from the STMS database are reformatted and returned to the inquiring entity. In an alternative embodiment, as part of the broker's back office processing capability for moving the security, the broker is required to enter identifying information for the securities certificates. The provision of this information will result in an automatic query on the STMS database as part of a normal transaction to move securities; the query taking place before the security certificates are used to transfer securities into a new account location. As such, by entering in certificate identifying information into a securities certificate account transfer form, the identifying information is used to send a query 415 to the STMS database 419*a* regarding the security certificates. The broker's processing system inquires on the STMS automatically and depending on the result from the STMS will continue/discontinue the transaction.

In an alternative embodiment, the physical certificates may be scanned and optical character recognition (OCR) software may be used to discern and retrieve the certificate identifying information. Once the certificates are converted to text, the text may be parsed for field indicia denoting certificate-identifying information. In one embodiment, once such information is parsed, the parsed information is saved in an XML data file suitable for batch processing. In another embodiment, OCR progresses on a graphic scan and embeds recognized text spatially into the graphic scan, e.g., as employed by Adobe Acrobat Professional's Paper Capture facility. OCR may be used to obtain batch information on a larger number of security certificates in an automated fashion. Also, brokers or others may manually enter batches of information into files for batch processing (see FIG. 5 for how the STMS may batch process such information).

The STMS then determines if an entry exists in the STMS database for the security certificate in question 420. If the certificate does exist 420, then a "hit" is generated at the STMS database 425. The hit signifies that someone inquired upon an invalid security. Record of this hit is stored in the STMS database 419*b* in tables as has already been described in FIG. 3. The STMS may then provide an alert to the broker 430 of the hit. The broker may be prompted to confiscate the security certificates for verification, confiscation, and/or the like activities as required by the broker in-house policies 430. Optionally, the broker may inform the client to contact their transfer agent for further instructions and/or otherwise confiscate the certificates and pass the certificates directly to the appropriate transfer agent via the DTCC 445. Upon confiscating, or not confiscating the securities certificates 445, report tables are updated in the STMS database 435; the updates record and report the details of the transaction. The reports 435 may be used to issue alerts to appropriate parties and/or authorities 440 through e-mails, secure HTTPS communications, pager messages, and/or the like. For example, the FBI, SEC, etc. may receive an email informing the authorities of the illicitly attempted transaction. Any entities disposed in communication with the STMS, as has been described in FIGS. 1 and 2 may receive such alerts. In one embodiment, the alerts are encrypted and/or otherwise securely transmitted.

Upon receiving the securities certificates from the DTCC the transfer agent will cancel the certificate 445; thus making it invalid for trade processing purposes and eligible for input onto the STMS. Upon determining that no record of the securities exists 420 in the STMS database 419*a*, a copy of the security certificates should be made 450.

In one embodiment, the transfer agent for that issue will confiscate the certificate after the physical certificate is submitted via the DTCC to the transfer agent. The transfer agent may then make a scanned electronic copy of the physical certificate before its destruction 450. After a copy is made 450, the transfer agent may cancel and/or otherwise destroy the physical certificate 460. This will serve to invalidate future attempts to traffic in physical certificates representing the same security and will be used if necessary by the transfer agent in legal proceedings. At this point, the investor's financial manager will create an account or transfer into the investor's account a book entry for the market value of the physical certificate. Also, in another embodiment, the scanning and recording of the physical security may occur from any of the entities communicating with the STMS as mentioned in FIGS. 1 and 2. It should be noted that various information regarding the now invalid certificate 460 and identified securities may be passed from the transfer agent and stored in the STMS database 419*c*. In an alternative embodiment, the scanned electronic copy of the now invalid certificate may be saved as well; i.e., any of the fields in the certificate related tables 310, 340, 320 may be entered through a Web form. A scanned copy of the certificate also may be transferred through the Web form. Transfer of the scanned certificate may take place by pointing the browser Web page to an electronic file copy of the certificate, which the browser Web page will then transfer to the STMS via an HTTPS post transfer.

Upon the making of an electronic copy 450 of the collected physical certificate 445, 450 and saving details of the transaction in the STMS database 419*c*, the STMS checks for errors 455. For example, if several people simultaneously attempt to traffic in the same security, an error will occur so that the STMS does not overwrite records regarding the same security. A display error will be sent 465 to all relevant parties (i.e., the submitting entities, system administrators, proper authorities (for the review of possible on-going massive fraud), and/or the like). The STMS may employ a recovery table 470. The recovery table holds records of securities certificates that users have reported as invalid. If securities certificates that were once reported as being lost are subsequently found, then such found-but-invalid certificates may be entered as a record 419*c* into the recovery table denoting that the certificate has now been recovered. The recovery table provides a history of certificates (and reports) that were believed to have been lost but later were found to be only temporarily misplaced. As part of the STMS database, when brokers or others check securities certificates, the recover table may also be queried; matches may also generate hits and alerts. Later, STMS flow resumes.

In another embodiment, the STMS may generate alerts 440 by querying for hits 425 in the STMS database 419 at a specified interval. This would serve to ensure that alerts would be generated with sufficient frequency to prevent them from being ignored.

Expired Securities Batch Detection

Figure 5:
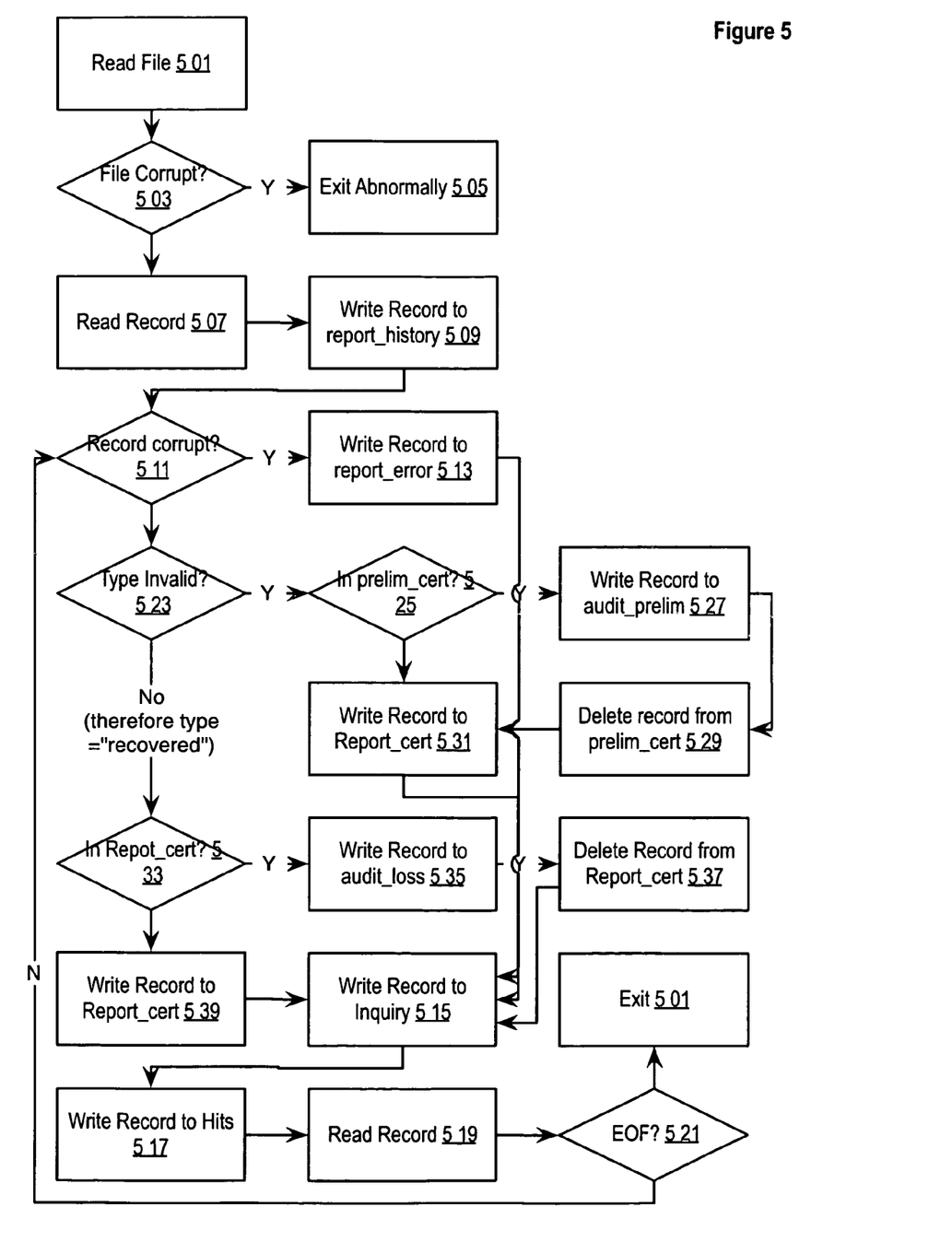
FIG. 5 is of a logic-flow diagram illustrating embodiments of a Securities Tracking Management System database subsystem for batch transaction processing in accordance with the present invention.

FIG. 5 is of a logic flow diagram illustrating embodiments of a Securities Tracking Management System database subsystem for batch transaction processing. FIG. 5 shows an alternative embodiment and greater detail regarding database transactions of FIG. 4. In one embodiment, a database file table contains numerous records of transactions involving physical securities certificates. Initially, the STMS reads the database file table 501. The STMS determines if the file is corrupt 503, and if it is, STMS exits abnormally 505. As already discussed, alternatively the STMS may employ error-handling routines (see 465, 470 of FIG. 4). If the file is intact 503, then the STMS reads a record 507 from the table; for example, this may occur when a query is submitted to the STMS and it identifies a certificate record matching the submitted query terms. Upon reading the database record 507, the STMS may write a record noting the circumstances regarding the access of the record in question in a report_history table 509. For example, information regarding who accessed the record, the reasons for the access, and the search terms that generated a hit and read of a record, all such information may be saved as part of the report history 509.

Then, the STMS may determine if the record read 507 is corrupt 511. If the record is corrupt 511, the error may be recorded to a report_error table 513. The inquiry is recorded to an inquiry table 515 and a hit is recorded 517. The next record is read 519 and STMS checks if the end-of-file has been reached 521. If the end of file has been reached, the STMS exits from batch processing the file 581. Otherwise processing continues 511.

If the latest record read 507 is not corrupt 511, the STMS determines if it represents an invalid securities certificate that has already been recorded in the STMS database 523. If it represents a non-recorded certificate 523, the STMS determines if there is no record of the certificate at issue in a Report_cert table 533, then a record of the now invalid certificate is written to a to a Report_cert table 539. However, if there is record of the certificate at issue in a Report_cert table 533, then a record of this match is stored to a table for auditing invalid certificates, e.g., audit_Report table, 535. Then the STMS deletes the matching record from the Report_cert table 537. An entry is made in the inquiry table 515 and flow continues as has already been discussed. This keeps track of the attempt to report on the audit file.

If the read record 507, 519 represents an invalid and recorded certificate 523, then the STMS may determine if the reporting institution does not know for certain if the certificate is invalid or not 525. If there the reporting institution is uncertain of invalidity status 525, then a record of this uncertainty is stored to a table for auditing the certificate, e.g., audit_prelim table, 527. Then the STMS deletes the corresponding record from the prelim_cert table 529.

If the reporting institution does know if the certificate is invalid or not 525 or if the STMS deleted a record from the prelim_cert table 529, then the STMS writes the read record 507, 519 to the Report_cert table 531. Then, an entry is made in the inquiry table 515 and flow continues as has already been discussed.

Securities Tracking Management System Controller

Figure 6:
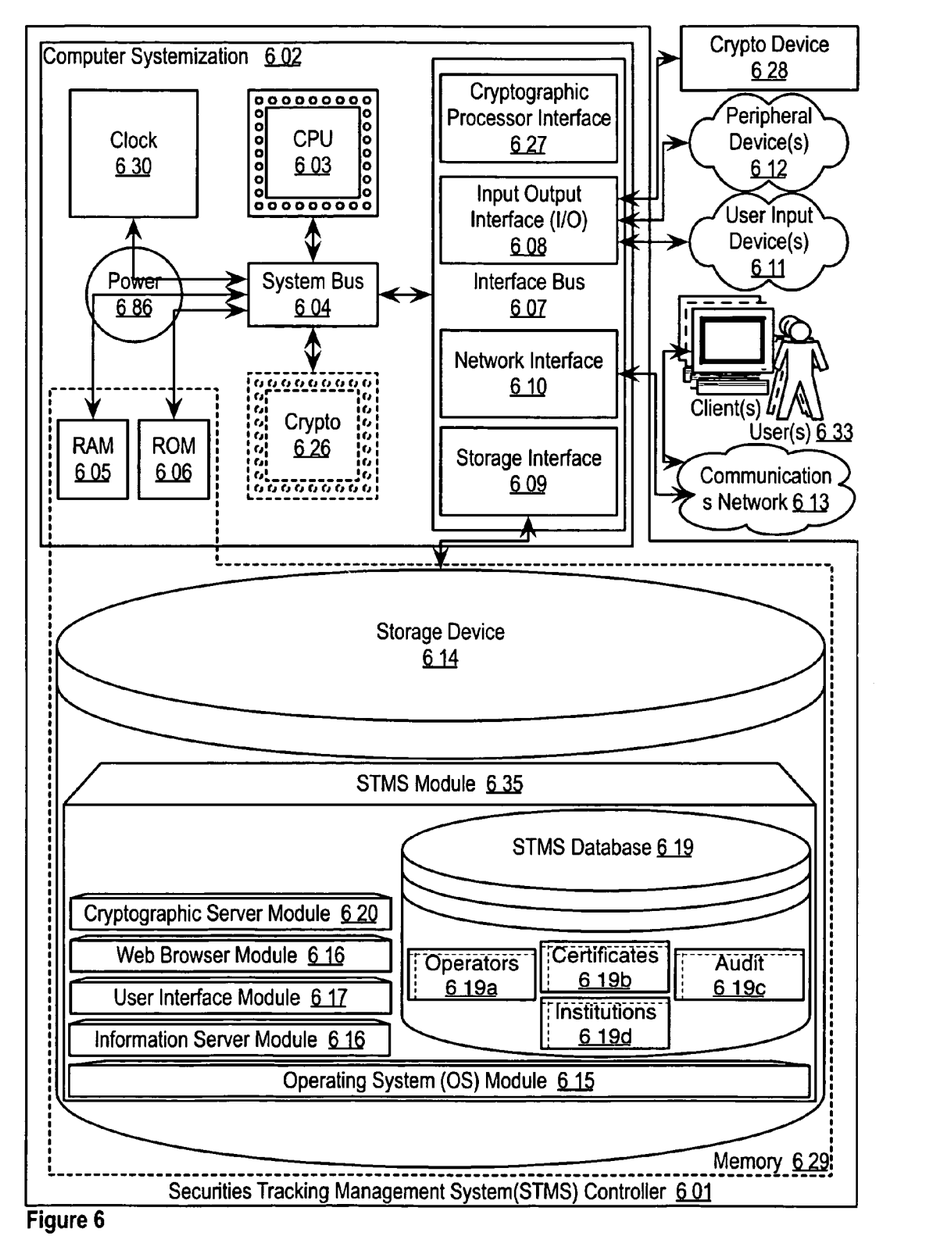
FIG. 6 is of a block diagram illustrating embodiments of a Securities Tracking Management System controller in accordance with the present invention.

FIG. 6 is of a block diagram illustrating embodiments of a Securities Tracking Management System (STMS) controller 601. In this embodiment, the STMS controller 601 may serve to process, store, search, serve, identify, instruct, generate, match, and/or update securities related data.

In one embodiment, the STMS controller 601 may be connected to and/or communicate with entities such as, but not limited to: one or more users from user input devices 611; peripheral devices 612; and/or a communications network 613. The STMS controller may even be connected to and/or communicate with a cryptographic processor device 628.

A STMS controller 601 may be based on common computer systems that may comprise, but are not limited to, components such as: a computer systemization 602 connected to memory 629.

Computer Systemization

A computer systemization 602 may comprise a clock 630, central processing unit (CPU) 603, a read only memory (ROM) 606, a random access memory (RAM) 605, and/or an interface bus 607, and most frequently, although not necessarily, are all interconnected and/or communicating through a system bus 604. Optionally, the computer systemization may be connected to an internal power source 686. Optionally, a cryptographic processor 626 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the causes of return and/or reply signal communications beyond the instant computer systemization to: communications networks, input devices, other computer systemizations, peripheral devices and/or the like. Of course, any of the above components may be connected directly to one another, connected to the CPU and/or organized in numerous variations employed as exemplified by various computer systems.

The CPU comprises at least one high-speed data processor adequate to execute program modules for executing user and/or system-generated requests. The CPU may be a microprocessor such as AMD's Athlon, Duron and/or Opteron; IBM and/or Motorola's PowerPC; Intel's Celeron, Itanium, Pentium, Xeon, and/or XScale; and/or the like processor(s). The CPU interacts with memory through signal passing through conductive conduits to execute stored program code according to conventional data processing techniques. Such signal passing facilitates communication within the STMS controller and beyond through various interfaces. Should processing requirements dictate a greater amount speed, mainframe and super computer architectures may similarly be employed. Alternatively, should deployment requirements dictate greater portability, smaller Personal Digital Assistants (PDAs) may be employed.

Power Source

The power source 686 may be of any standard form for powering small electronic circuit board devices such as the following power cells: alkaline, lithium hydride, lithium ion, nickel cadmium, solar cells and/or the like. Other types of AC or DC power sources may be used as well. In the case of solar cells, in one embodiment, the case provides an aperture through which the solar cell may capture photonic energy. The power cell 686 is connected to at least one of the interconnected subsequent components of the STMS thereby providing an electric current to all subsequent components. In one example, the power source 686 is connected to the system bus component 604. In an alternative embodiment, an outside power source 686 is provided through a connection across the I/O 608 interface. For example, a USB and/or IEEE 1394 connection carries both data and power across the connection and is therefore a suitable source of power.

Interface Adapters

Interface bus(ses) 607 may accept, connect, and/or communicate to a number of interface adapters, conventionally although not necessarily in the form of adapter cards, such as but not limited to: input output interfaces (I/O) 608, storage interfaces 609, network interfaces 610, and/or the like. Optionally, cryptographic processor interfaces 627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 609 may accept, communicate, and/or connect to a number of storage devices such as, but not limited to: storage devices 614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 610 may accept, communicate, and/or connect to a communications network 613. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 610 may be used to engage with various communications network types 613. For example, multiple network interfaces may be employed to allow for the communication over broadcast, multicast, and/or unicast networks.

Input Output interfaces (I/O) 608 may accept, communicate, and/or connect to user input devices 611, peripheral devices 612, cryptographic processor devices 628, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, composite, digital, Digital Visual Interface (DVI), RCA, S-Video, VGA, and/or the like; wireless; and/or the like. A common output device is a video display, which typically comprises a Cathode Ray Tube (CRT) or Liquid Crystal Display (LCD) based monitor with an interface (e.g., DVI circuitry and cable) that accepts signals from a video interface. The video interface composites information generated by a computer systemization and generates video signals based on the composited information in a video memory frame. Typically, the video interface provides the composited video information through a video connection interface that accepts a video display interface (e.g., a DVI connector accepting a DVI display cable).

User input devices 611 may be card readers, dongles, finger print readers, gloves, graphics tablets, joysticks, keyboards, mouse (mice), trackballs, trackpads, retina readers, and/or the like.

Peripheral devices 612 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, visors, and/or the like.

It should be noted that although user input devices and peripheral devices may be employed, the STMS controller may be embodied as an embedded, dedicated, and/or headless device, wherein access would be provided over a network interface connection.

Cryptographic units such as, but not limited to, microcontrollers, processors 626, interfaces 627, and/or devices 628 may be attached, and/or communicate with the STMS controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 629. However, memory is a fungible technology and resource, thus, any number of memory embodiments may be employed in lieu of or in concert with one another. It is to be understood that a STMS controller and/or a computer systemization may employ various forms of memory 629. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 629 will include ROM 606, RAM 605, and a storage device 614. A storage device 614 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); and/or other devices of the like. Thus, a computer systemization generally requires and makes use of memory.

Module Collection

The memory 629 may contain a collection of program and/or database modules and/or data such as, but not limited to: operating system module(s) 615 (operating system); information server module(s) 616 (information server); user interface module(s) 617 (user interface); Web browser module(s) 618 (Web browser); database(s) 619; cryptographic server module(s) 620 (cryptographic server); STMS module(s) 635;

and/or the like (i.e., collectively a module collection). These modules may be stored and accessed from the storage devices and/or from storage devices accessible through an interface bus. Although non-conventional software modules such as those in the module collection, typically, are stored in a local storage device 614, they may also be loaded and/or stored in memory such as: peripheral devices, RAM, remote storage facilities through a communications network, ROM, various forms of memory and/or the like.

Operating System

The operating system module 615 is executable program code facilitating the operation of a STMS controller. Typically, the operating system facilitates access of I/O, network interfaces, peripheral devices, storage devices and/or the like. The operating system may be a highly fault tolerant, scalable, and secure system such as Apple Macintosh OS X (Server), AT&T Plan 9, Be OS, Linux, Unix and/or the like operating systems. However, more limited and/or less secure operating systems also may be employed such as Apple Macintosh OS, Microsoft DOS, Palm OS, Windows 2000/2003/3.1/95/98/CE/Millennium/NT/XP (Server), and/or the like. An operating system may communicate to and/or with other modules in a module collection, including itself, and/or the like. Most frequently, the operating system communicates with other program modules, user interfaces and/or the like. For example, the operating system may contain, communicate, generate, obtain and/or provide program module, system, user and/or data communications, requests and/or responses. The operating system, once executed by the CPU, may enable the interaction with communications networks, data, I/O, peripheral devices, program modules, memory, user input devices, and/or the like. The operating system may provide communications protocols that allow the STMS controller to communicate with other entities through a communications network 613. Various communication protocols may be used by the STMS controller as a subcarrier transport mechanism for interaction, such as, but not limited to: multicast, TCP/IP, UDP, unicast and/or the like.

Information Server

An information server module 616 is stored program code that is executed by the CPU. The information server may be a conventional Internet information server such as, but not limited to Apache Software Foundation's Apache, Microsoft's Internet Information Server and/or the like. The information server may allow for the execution of program modules through facilities such as Active Server Page (ASP), ActiveX, (ANSI) (Objective-) C (++), Common Gateway Interface (CGI) scripts, Java, JavaScript, Practical Extraction Report Language (PERL), Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. The information server provides results in the form of Web pages to Web browsers, and allows for the manipulated generation of the Web pages through interaction with other program modules. After a Domain Name System (DNS) resolution portion of an HTTP request is resolved to a particular information server, the information server resolves requests for information at specified locations on a STMS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other modules in a module collection, including itself, and/or facilities of the like. Most frequently, the information server communicates with the STMS database 619, operating systems, other program modules, user interfaces, Web browsers, and/or the like.

Access to STMS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the STMS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the STMS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain and/or provide program module, system, user and/or data communications, requests and/or responses.

User Interface

A user interface module 617 is stored program code that is executed by the CPU. The user interface may be a conventional graphic user interface as provided by, with, and/or atop operating systems and/or operating environments such as Apple Macintosh OS, e.g., Aqua, Microsoft Windows (NT/XP), Unix X Windows (KDE, Gnome, and/or the like), and/or the like. The user interface may allow for the display, execution, interaction, manipulation and/or operation of program modules and/or system facilities through textual and/or graphical facilities. The user interface provides a facility through which users may affect, interact and/or operate a computer system. A user interface may communicate to and/or with other modules in a module collection, including itself, and/or facilities of the like. Most frequently, the user interface communicates with operating systems, other program modules and/or the like. The user interface may contain, communicate, generate, obtain and/or provide program module, system, user and/or data communications, requests and/or responses.

Web Browser

A Web browser module 618 is stored program code that is executed by the CPU. The Web browser may be a conventional hypertext viewing application such as Microsoft Internet Explorer or Netscape Navigator. Secure Web browsing may be supplied with 128 bit (or greater) encryption by way of HTTPS, SSL and/or the like. Some Web browsers allow for the execution of program modules through facilities such as Java, JavaScript, ActiveX and/or the like. Web browsers and like information access tools may be integrated into PDAs, cellular telephones, and/or other mobile devices. A Web browser may communicate to and/or with other modules in a module collection, including itself, and/or facilities of the like. Most frequently, the Web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a Web browser and information server, a combined application may be developed to perform similar functions of both. The combined application would similarly affect the obtaining and the provision of information to users, user agents, and/or the like from STMS enabled nodes. The combined application may be nugatory on systems employing standard Web browsers.

Cryptographic Server

A cryptographic server module 620 is stored program code that is executed by the CPU 603, cryptographic processor 626, cryptographic processor interface 627, cryptographic processor device 628, and/or the like. Cryptographic processor interfaces will allow for expedition of encryption and/or decryption requests by the cryptographic module; however, the cryptographic module, alternatively, may run on a conventional CPU. The cryptographic module allows for the encryption and/or decryption of provided data. The cryptographic module allows for both symmetric and asymmetric (e.g., Pretty Good Protection (PGP)) encryption and/or decryption. The cryptographic module may employ cryptographic techniques such as, but not limited to: digital certificates (e.g., X.509 authentication framework), digital signatures, dual signatures, enveloping, password access protection, public key management and/or the like. The cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the STMS may encrypt all incoming and/or outgoing communications and may serve as node within a virtual private network (VPN) with a wider communications network. The cryptographic module facilitates the process of "security authorization" whereby access to a resource is inhibited by a security protocol wherein the cryptographic module effects authorized access to the secured resource. In addition, the cryptographic module may provide unique identifiers of content, e.g., employing and MD5 hash to obtain a unique signature for a digital audio file. A cryptographic module may communicate to and/or with other modules in a module collection, including itself, and/or facilities of the like. The cryptographic module supports encryption schemes allowing for the secure transmission of information across a communications network to enable a STMS module to engage in secure transactions if so desired. The cryptographic module facilitates the secure accessing of resources on STMS and facilitates the access of secured resources on remote systems; i.e., it may act as a client and/or server of secured resources. Most frequently, the cryptographic module communicates with information servers, operating systems, other program modules and/or the like. The cryptographic module may contain, communicate, generate, obtain and/or provide program module, system, user and/or data communications, requests and/or responses.

STMS Database

A STMS database module 619 may be embodied in a database and its stored data. The database is stored program code, which is executed by the CPU; the stored program code portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the STMS database may be implemented using various standard data-structures, such as an array, hash, (linked) list, struct, structured text file (e.g., XML), table and/or the like. Such data-structures may be stored in memory and/or in (structured) files. In another alternative, an object-oriented database may be used, such as Frontier, ObjectStore, Poet, Zope and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the STMS database is implemented as a data-structure, the use of the STMS database 619 may be integrated into another module such as the STMS module 635. Also, the database may be implemented as a mix of data structures, objects and relational structures. Databases may be consolidated and/or distributed in countless variations through standard data processing techniques. Portions of databases, e.g., tables, may be exported and/or imported and thus decentralized and/or integrated.

In one embodiment, the database module 619 includes several tables 619*a-d*. An Operators table 619*a* includes fields such as, but not limited to: an Operator_id, Operator_name and/or the like. A Certificate table 619*b* includes fields such as, but not limited to: Cusip, Operator_id, Cert_Num, Trans_Date, Trans_Num, Trans_Type, Rpt_Ctl_Num, Origin_Date, Rpt_Source, Report_Id, and/or the like. An Audit table 619*c* includes fields such as, but not limited to: Audit_id, Time, Date, Action, Report_id, Operator_id, Mod_Reason, and/or the like. An Institutions table 619*d* includes fields such as, but not limited to: Institution_id, Branch ID, Access code, and/or the like. The database module includes other tables and relations as already discussed in FIG. 1 and throughout the disclosure.

In one embodiment, user programs may contain various user interface primitives, which may serve to update STMS. Also, various accounts may require custom database tables depending upon the environments and the types of clients a STMS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database modules 619a-d. The STMS may be configured to keep track of various settings, inputs and parameters via database controllers.

A STMS database may communicate to and/or with other modules in a module collection, including itself, and/or facilities of the like. Most frequently, the STMS database communicates with a STMS module, other program modules and/or the like. The database may contain, retain and provide information regarding other nodes and data.

STMS

A STMS module 635 is stored program code that is executed by the CPU. The STMS affects accessing, obtaining and the provision of information, services, transactions and/or the like across various communications networks.

The STMS enables users to simply access data and/or services across a communications network in a secure manner. The STMS stores details of invalid securities, enables users to query for securities and acts as a verification facility to validate securities. The STMS coordinates with the STMS database to identify interassociated items relating to invalid certificates and acts upon any provided information.

A STMS module enabling access of information between nodes may be developed by employing standard development tools such as, but not limited to: (ANSI) (Objective-) C (++), Apache modules, binary executables, database adapters, Java, JavaScript, mapping tools, procedural and object oriented development tools, PERL, Python, shell scripts, SQL commands, web application server extensions, WebObjects, and/or the like. In one embodiment, the STMS server employs a cryptographic server to encrypt and decrypt communications. A STMS module may communicate to and/or with other modules in a module collection, including itself, and/or facilities of the like. Most frequently, the STMS module communicates with a STMS database, operating systems, other program modules and/or the like. The STMS may contain, communicate, generate, obtain and/or provide program module, system, user and/or data communications, requests and/or responses.

Distributed STMS

The structure and/or operation of any of the STMS node controller components may be combined, consolidated and/or distributed in any number of ways to facilitate development and/or deployment. Similarly, the module collection may be combined in any number of ways to facilitate deployment and/or development. To accomplish this, one may integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load-balancing and/or data-processing techniques. Furthermore, single instances may also be distributed across multiple controllers and/or storage devices; e.g., databases. All program module instances and controllers working in concert may do so through standard data processing communication techniques.

The configuration of the STMS controller will depend on the context of system deployment. Factors such as, but not limited to, the budget, capacity, location and/or use of the underlying hardware resources may affect deployment requirements and configuration. Regardless of if the configuration results in more consolidated and/or integrated program modules, results in a more distributed series of program modules, and/or results in some combination between a consolidated and distributed configuration, data may be communicated, obtained, and/or provided. Instances of modules consolidated into a common code base from the program module collection may communicate, obtain and/or provide data. This may be accomplished through intra-application data processing communication techniques such as, but not limited to: data referencing (e.g., pointers), internal messaging, object instance variable communication, shared memory space, variable passing, and/or the like.

If module collection components are discrete, separate, and/or external to one another, then communicating, obtaining, and/or providing data with and/or to other module components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), process pipes, shared files, and/or the like. Messages sent between discrete module components for inter-application communication or within memory spaces of a singular module for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between modules. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of space and reducing repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method of using a computer system to validate securities certificates at the time of dematerialization, comprising:
   obtaining identifying indicia for an instant physical securities certificate,
wherein the indicia is read from the instant physical securities certificate, querying a database with the indicia;
   generating, in the computer system, a match entry indicative that the queried indicia matches a securities certificate record in the database, if the indicia matches a securities certificate record in the database, wherein the securities certificate record in the database indicates that a physical version of a respective securities certificate is already invalid, wherein invalid constitutes that a certificate is to be described as being in at least one of the following states including: destroyed, and escheated;
   storing the match entry in the database;
   generating, in the computer system, a new entry representing the instant physical securities certificate, if the indicia does not match a securities certificate record in the database, wherein the new entry indicates that the instant physical securities certificate has become invalid;
   storing the new entry in the database;
   storing an electronic facsimile of the instant physical securities certificate in a database record, wherein if the facsimile entry is associated with the match entry, then the match entry is flagged as being invalid, flagging the new entry as being invalid, if the facsimile entry is associated with the new entry;
   alerting entities of entries made in the database, wherein the alerts provide notice of trafficking in invalid certificates, if the indicia matches a securities certificate record in the database, and wherein the alerts are sent to any of: brokers, transfer agents, system administrators, banks, securities issuers, law enforcement agencies, and a DTCC.

2. The method of claim 1, wherein the alerts are made through any of: e-mails, a World Wide Web, a pager network, a phone network to the entities and which are conveyed through voice synthesis, a voice mail created through voice synthesis, and a fax sent to the entities.

3. A computer system to validate securities certificates at the time of dematerialization, comprising:
   means for obtaining identifying indicia for an instant physical securities certificate, wherein the indicia is read from the instant physical securities certificate, means for querying a database with the indicia;
   means for generating a match entry indicative that the queried indicia matches a securities certificate record in the database, if the indicia matches a securities certificate record in the database, wherein the securities certificate record in the database indicates that a physical version of a respective securities certificate is already invalid, wherein invalid constitutes that a certificate is to be described as being in at least one of the following states including: destroyed, arid escheated;
   means for storing the match entry in the database;
   means for generating a new entry representing the instant physical securities certificate, if the indicia does not match a securities certificate record in the database, wherein the new entry indicates that the instant physical securities certificate has become invalid; means for storing the new entry in the database;
   means for storing an electronic facsimile of the instant physical securities certificate in a database record, wherein if the facsimile entry is associated with the match entry, then the match entry is flagged as being invalid,
   means for flagging the new entry as being invalid, if the facsimile entry is associated with the new entry;
   means for alerting entities of entries made in the database, wherein the alerts provide notice of trafficking in invalid certificates, if the indicia matches a securities certificate record in the database, and wherein the alerts are sent to any of: brokers, transfer agents, system administrators, banks, securities issuers, law enforcement agencies, and a DTCC.

4. A computer readable medium, readable by a processor to validate securities certificates at the time of dematerialization, comprising:
   instructions stored on a computer readable medium, wherein the instructions are issuable by the processor to:
   obtain identifying indicia for an instant physical securities certificate, wherein the indicia is read from the instant physical securities certificate;
   query a database with the indicia;
   generate a match entry indicative that the queried indicia matches a securities certificate record in the database, if the indicia matches a securities certificate record in the database, wherein the securities certificate record in the database indicates that a physical version of a respective securities certificate is already invalid, wherein invalid constitutes that a certificate is to be described as being in at least one of the following states including: destroyed, and escheated;
   store the match entry in the database;
   generate a new entry representing the instant physical securities certificate, if the indicia does not match a securities certificate record in the database, wherein the new entry indicates that the instant physical securities certificate has become invalid;
   store the new entry in the database;
   store an electronic facsimile of the instant physical securities certificate in a database record, wherein if the facsimile entry is associated with the match entry, then the match entry is flagged as being invalid,
   flag the new entry as being invalid, if the facsimile entry is associated with the new entry;
   alert entities of entries made in the database, wherein the alerts provide notice of trafficking in invalid certificates, if the indicia matches a securities certificate record in the database, and wherein the alerts are sent to any of: brokers, transfer agents, system administrators, banks, securities issuers, law enforcement agencies, and a DTCC.

5. An apparatus to validate securities certificates at the time of dematerialization, comprising:
   a memory;
   a processor disposed in communication with said memory, and configured to issue a plurality of processing instructions stored in the memory, wherein the instructions issue signals to:

obtain identifying indicia for an instant physical securities certificate, wherein the indicia is read from the instant physical securities certificate, query a database with the indicia;

generate a match entry indicative that the queried indicia matches a securities certificate record in the database, if the indicia matches a securities certificate record in the database, wherein the securities certificate record in the database indicates that a physical version of a respective securities certificate is already invalid, wherein invalid constitutes that a certificate is to be described as being in at least one of the following states including: destroyed, and escheated;

store the match entry in the database;

generate a new entry representing the instant physical securities certificate, if the indicia does not match a securities certificate record in the database, wherein the new entry indicates that the instant physical securities certificate has become invalid;

store the new entry in the database;

store an electronic facsimile of the instant physical securities certificate in a database record, wherein if the facsimile entry is associated with the match entry, then the match entry is flagged as being invalid, flag the new entry as being invalid, if the facsimile entry is associated with the new entry;

alert entities of entries made in the database, wherein the alerts provide notice of trafficking in invalid certificates, if the indicia matches a securities certificate record in the database, and wherein the alerts are sent to any of: brokers, transfer agents, system administrators, banks, securities issuers, law enforcement agencies, and a DTCC.

\* \* \* \* \*